United States Patent
Taira et al.

(10) Patent No.: US 9,202,634 B2
(45) Date of Patent: *Dec. 1, 2015

(54) METHOD FOR MANUFACTURING ELECTRODE MATERIAL FOR ALUMINUM ELECTROLYTIC CAPACITOR

(71) Applicant: TOYO ALUMINIUM KABUSHIKI KAISHA, Osaka (JP)

(72) Inventors: Toshifumi Taira, Osaka (JP); Masashi Mehata, Osaka (JP)

(73) Assignee: TOYO ALUMINIUM KABUSHIKI KAISHA, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/375,884

(22) PCT Filed: Feb. 7, 2013

(86) PCT No.: PCT/JP2013/052857
§ 371 (c)(1),
(2) Date: Jul. 31, 2014

(87) PCT Pub. No.: WO2013/118818
PCT Pub. Date: Aug. 15, 2013

(65) Prior Publication Data
US 2014/0368975 A1  Dec. 18, 2014

(30) Foreign Application Priority Data
Feb. 10, 2012  (JP) .................. 2012-027102

(51) Int. Cl.
| | | |
|---|---|---|
| *H01G 9/00* | (2006.01) | |
| *H01G 9/15* | (2006.01) | |
| *H01G 9/045* | (2006.01) | |
| *H01G 9/052* | (2006.01) | |
| *B22F 7/08* | (2006.01) | |
| *C22C 21/00* | (2006.01) | |
| *C22F 1/04* | (2006.01) | |
| *B23K 35/40* | (2006.01) | |
| *H01G 9/055* | (2006.01) | |

(52) U.S. Cl.
CPC .............. *H01G 9/0525* (2013.01); *B22F 7/08* (2013.01); *B23K 35/40* (2013.01); *C22C 21/00* (2013.01); *C22F 1/04* (2013.01); *H01G 9/0036* (2013.01); *H01G 9/045* (2013.01); *H01G 9/052* (2013.01); *H01G 9/15* (2013.01); *H01G 9/055* (2013.01); *Y02T 10/7022* (2013.01)

(58) Field of Classification Search
USPC .................. 361/529; 419/9; 427/80
See application file for complete search history.

(56) References Cited

U.S. PATENT DOCUMENTS

| | | | |
|---|---|---|---|
| 3,004,332 A * | 10/1961 | Werner | ...................... 428/539.5 |
| 3,196,323 A | 7/1965 | Rogers et al. | |
| 3,258,826 A | 7/1966 | Boone et al. | |
| 3,732,470 A | 5/1973 | Robinson | |
| 4,633,373 A | 12/1986 | Phillips | |
| 4,888,666 A | 12/1989 | Naitoh et al. | |
| 4,907,130 A | 3/1990 | Boulloy et al. | |
| 5,473,503 A | 12/1995 | Sakata et al. | |
| 6,785,123 B2 | 8/2004 | Keser | |
| 6,873,518 B2 | 3/2005 | Masuda et al. | |
| 6,914,769 B2 * | 7/2005 | Welsch et al. | ................. 361/508 |
| 7,320,714 B2 | 1/2008 | Keser | |
| 7,388,740 B2 | 6/2008 | Ro et al. | |
| 7,456,073 B2 | 11/2008 | Fife et al. | |
| 7,760,489 B2 | 7/2010 | Fujita et al. | |
| 8,213,159 B2 | 7/2012 | Imanaka et al. | |
| 2006/0028787 A1 | 2/2006 | Yoshida et al. | |
| 2006/0204735 A1 | 9/2006 | Naito | |
| 2009/0021894 A1 | 1/2009 | Ning et al. | |
| 2011/0038098 A1* | 2/2011 | Taira et al. | .................... 361/500 |
| 2011/0053764 A1 | 3/2011 | Taira et al. | |

(Continued)

FOREIGN PATENT DOCUMENTS

| | | |
|---|---|---|
| DE | 4127743 A1 | 3/1993 |
| JP | 61-184812 A | 8/1986 |

(Continued)

OTHER PUBLICATIONS

International Search Report dated Mar. 12, 2013, issued in corresponding application No. PCT/JP2013/052857.
International Search Report, dated in Oct. 16, 2012, issued in corresponding application No. PCT/JP2012/067653, issued in co-pending U.S. Appl. No. 14/232,770 (2 pages).
International Search Report dated Aug. 14, 2012 issued in corresponding application No. PCT/JP2012/062927, issued in related U.S. Appl. No. 14/122,038 (2 pages).

(Continued)

*Primary Examiner* — Asok K Sarkar
(74) *Attorney, Agent, or Firm* — Westerman, Hattori, Daniels & Adrian, LLP

(57) ABSTRACT

The present invention makes it possible to increase the thickness of a sintered body. Thus, the present invention provides a production method that is suitable for the production of anode electrode materials with high capacitance useful for medium- to high-voltage aluminum electrolytic capacitors, that does not involve an etching treatment, and that enables desired formation of the resulting electrode material for aluminum electrolytic capacitor into the desired shape.

Specifically, the present invention provides a method for producing an electrode material for aluminum electrolytic capacitor, comprising the steps of:
(1) forming, in a sintering mold, an unsintered laminate in which a substrate is held between compositions comprising a powder of at least one member selected from the group consisting of aluminum and aluminum alloys; and
(2) sintering the unsintered laminate in the sintering mold, wherein the method does not comprise an etching step.

11 Claims, No Drawings

(56) References Cited

U.S. PATENT DOCUMENTS

| | | | |
|---|---|---|---|
| 2012/0094016 A1 | 4/2012 | Taira et al. | |
| 2012/0219817 A1 | 8/2012 | Konishi et al. | |
| 2012/0231262 A1 | 9/2012 | Sone et al. | |
| 2014/0098460 A1* | 4/2014 | Taira et al. | 361/500 |
| 2014/0211375 A1* | 7/2014 | Taira et al. | 361/529 |

FOREIGN PATENT DOCUMENTS

| | | | |
|---|---|---|---|
| JP | 63-124511 | A | 5/1988 |
| JP | 02-091918 | A | 3/1990 |
| JP | 2-267916 | A | 11/1990 |
| JP | 9-167720 | A | 6/1997 |
| JP | 11-199992 | A | 7/1999 |
| JP | 2000-012400 | A | 1/2000 |
| JP | 2004-336018 | A | 11/2004 |
| JP | 2004-343096 | A | 12/2004 |
| JP | 2004-363491 | A | 12/2004 |
| JP | 2006-049760 | A | 2/2006 |
| JP | 2006-108159 | A | 4/2006 |
| JP | 2006-186248 | A | 7/2006 |
| JP | 2008-98279 | A | 4/2008 |
| JP | 2011-52291 | A | 3/2011 |
| JP | 2011-74468 | A | 4/2011 |
| WO | 2004/088690 | A1 | 10/2004 |
| WO | 2007/091656 | A1 | 8/2007 |
| WO | 2010/146973 | A1 | 12/2010 |
| WO | 2011/070915 | A1 | 6/2011 |

OTHER PUBLICATIONS

International Search Report of PCT/JP2008/057782, mailing date Jul. 29, 2008, issued in related U.S. Appl. No. 12/988,405 (1 page).
Chen, "Solid Aluminum Electrolytic Capacitor", Xian Jiatong University Press, dated Oct. 1986, p. 153 cited in Chinese Office Action dated Oct. 30, 2012. With Partial English Translation.
Chinese Office Action dated Dec. 21, 2011, issued in corresponding Chinese Patent Application No. 200880128783.4. (3 pages).
U.S. Office Action dated Sep. 10, 2012, issued in U.S. Appl. No. 12/988,405 (24 pages).
U.S. Office Action dated Jul. 9, 2014, issued in U.S. Appl. No. 12/988,405 (17 pages).
U.S. Office Action dated Jul. 1, 2013, issued in U.S. Appl. No. 12/988,405 (24 pages).
U.S. Office Action dated Feb. 28, 2013, issued in U.S. Appl. No. 12/988,405 (17 pages).
U.S. Office Action dated Feb. 24, 2014, issued in U.S. Appl. No. 12/988,405 (19 pages).
U.S. Office Action dated Dec. 29, 2014, issued in U.S. Appl. No. 12/988,405 (16 pages).
Chen, Guoguang; "Aluminum Electrolytic Capacitor"; Xian Jiatong University Press, Oct. 1986, pp. 184-197. (cited in Chinese Office Action dated Dec. 21, 2011) partial English translation.
Extended European Search Report dated Jul. 10, 2015 issued in counterpart European Patent Application No. 12814958.0 (8 pages).
Non-Final Office Action dated Aug. 27, 2015, issued in U.S. Appl. No. 14/232,770 (23 pages).

* cited by examiner

METHOD FOR MANUFACTURING ELECTRODE MATERIAL FOR ALUMINUM ELECTROLYTIC CAPACITOR

TECHNICAL FIELD

The present invention relates to a method for producing an electrode material for an aluminum electrolytic capacitor, in particular, an anode electrode material for a medium- to high-voltage aluminum electrolytic capacitor.

BACKGROUND ART

Until now, aluminum electrolytic capacitors have been widely used as capacitors in energy-related fields, such as for inverter power supplies for hybrid vehicles, or storage of wind-generated electricity. Aluminum foil is generally used as an electrode material for such aluminum electrolytic capacitors.

The surface area of aluminum foil used as an electrode material for aluminum electrolytic capacitors can be increased by forming etching pits by using etching treatment. Then, the etched surface of the aluminum foil is anodized to form an oxide film that functions as a dielectric. Therefore, various anode electrode materials (foil) for aluminum electrolytic capacitors for a variety of purposes can be produced by etching aluminum foil and forming an anodic oxide film by applying a varying voltage to the etched surface according to the voltage to be used.

Through the etching treatment, pores called "etching pits" are formed in aluminum foil. The etching pits are formed into various shapes according to the voltage applied when anodization is performed.

More specifically, it is necessary to form a thick oxide film in aluminum foil to be used as a medium- to high-voltage anode for a medium- to high-voltage capacitor; therefore, in order to prevent the etching pits from being buried by such a thick oxide film, tunnel etching pits are formed on aluminum foil used as a medium- to high-voltage anode typically by direct-current etching, and the etching pits are processed to have an appropriate thickness suited for the voltage to be used.

On the other hand, since it is necessary to form small etching pits in aluminum foil for a low-voltage capacitor, sponge-like etching pits are formed typically by alternating-current etching. The surface area of cathode foil is similarly increased by etching.

However, these etching treatments require the use of an aqueous hydrochloric acid solution containing sulfuric acid, phosphoric acid, nitric acid, or the like. Hydrochloric acid increases the burden on the environment, and its disposal also becomes a burden on the process and on the economy.

In the etching treatment to form etching pits, uniform pit formation is difficult because the conditions of pit formation depend on the metallic properties of aluminum foil, the oxide film, small scratches and like surface conditions. For this reason it is possible that pits may be merged in some regions or even may not be formed, and so "pit control" for forming uniform pits has been unsatisfactory. Other drawbacks include the limited increase in capacitance and a decrease in the strength of the aluminum foil due to the formation of a large number of small pits.

Under such circumstances, a need has arisen for the development of a novel method that enables an increase in the surface area of aluminum foil without the need for etching.

In order to meet this demand, an aluminum electrolytic capacitor characterized by use of aluminum foil having a fine aluminum powder adhering to its surface has been proposed (see, for example, Patent Document 1).

However, the method for adhering aluminum powder to aluminum foil by plating and/or vacuum evaporation disclosed in Patent Document 1 is incapable of thickly adhering the aluminum powder, and so there is a limit to the increase in capacitance. Further, with that method, it is difficult to attach the aluminum particles to the aluminum foil while ensuring sufficient space between them. Therefore, the aluminum powder used in this method is insufficient at least as a substitute for the thick etching pits required for medium- to high-voltage capacitors.

Further, an electrode material for an aluminum electrolytic capacitor comprising a sintered body of at least one member selected from the group consisting of aluminum and aluminum alloys is disclosed as an electrode material for an aluminum electrolytic capacitor that can be produced without an etching treatment (see, for example, Patent Document 2). This sintered body has a unique structure configured by sintering aluminum or aluminum alloy powder particles while keeping space between the particles. Because of this structure, this sintered body is considered to have a capacitance equivalent to or higher than that of known etched foil (paragraph [0012] of Patent Document 2).

However, the technique disclosed in Patent Document 2 is still insufficient in controlling the space between the particles, and the porosity. This may lead to failure in obtaining the desired capacitance since the space may be buried, or excessively extended upon the formation of an anodic oxide film by application of a varying voltage according to the voltage to be used.

Further, since the electrode material for an aluminum electrolytic capacitor disclosed in Patent Document 2 is formed by coating a substrate with a paste composition containing aluminum powder or the like by thermocompression or application, and then sintering the paste composition, it is difficult to thickly coat the substrate with the paste composition. Thus, if an increase in capacitance is required, it is necessary to form a multilayer of the paste composition on the substrate.

Further, since the paste composition contains powder particles dispersed in a binder resin, a defatting process is required after the coating. This defatting process becomes difficult if the paste composition is thickly applied; therefore, there is a limit to the thickness of the paste composition, thus failing to produce a capacitor with a high capacitance.

Still further, since the paste composition is formed by coating, it is difficult to form the capacitor into the desired shape, thus failing to obtain a capacitor with a shape suitable for the circuit design, or a capacitor with a specially designed shape.

CITATION LIST

Patent Document

Patent Document 1: JP H2-267916A
Patent Document 2: JP 2008-98279A

SUMMARY OF INVENTION

Technical Problem

The present invention makes it possible to increase the thickness of the sintered body. Thus, an object of the present invention is to provide a production method that is suitable for the production of anode electrode materials with high capacitance useful for medium- to high-voltage aluminum electrolytic capacitors, that does not involve etching treatment, and that enables desired formation of the resulting electrode material for an aluminum electrolytic capacitor into the desired shape.

Solution to Problem

The inventors of the present invention conducted extensive research to attain the above object and found that the object can be accomplished with a production method comprising forming, in a sintering mold, an unsintered laminate in which a substrate is held between compositions comprising a powder of at least one member selected from the group consisting of aluminum and aluminum alloys, and sintering the laminate. With this finding, the inventors completed the present invention.

Specifically, the present invention relates to the following electrode materials for aluminum electrolytic capacitor, and production methods thereof.

Item 1. A method for producing an electrode material for an aluminum electrolytic capacitor, comprising the steps of:

(1) forming, in a sintering mold, an unsintered laminate in which a substrate is held between compositions comprising a powder of at least one member selected from the group consisting of aluminum and aluminum alloys; and (2) sintering the unsintered laminate in the sintering mold, wherein the method does not comprise an etching step.

Item 2. The method according to Item 1, wherein the substrate is an aluminum foil or an aluminum alloy foil.

Item 3. The method according to Item 1 or 2, wherein each of the compositions on both sides of the substrate in the unsintered laminate has a thickness of 1 to 100 mm.

Item 4. The method according to anyone of Items 1 to 3, wherein the method does not comprise a defatting step.

Item 5. The method according to anyone of Items 1 to 4, wherein the sintering is performed at 560 to 660° C.

Item 6. The method according to anyone of Items 1 to 5, wherein the powder has an average particle diameter $D_{50}$ of 1 to 15 µm.

Item 7. The method according to anyone of Items 1 to 6, wherein the composition is free of binder resin.

Item 8. An electrode material for an aluminum electrolytic capacitor produced by the method according to any one of Items 1 to 7, wherein the electrode material is structured such that sintered bodies are formed on both sides of a substrate, each sintered body being obtained by sintering a composition comprising a powder of at least one member selected from the group consisting of aluminum and aluminum alloys.

Item 9. The electrode material for an aluminum electrolytic capacitor according to Item 8, wherein each of the sintered bodies on both sides of the substrate has a thickness of 1 to 100 mm.

Item 10. The electrode material for an aluminum electrolytic capacitor according to Item 8 or 9, wherein the substrate is aluminum foil or aluminum alloy foil.

Item 11. The electrode material for an aluminum electrolytic capacitor according to any one of Items 8 to 10, wherein the powder has an average particle diameter $D_{50}$ of 1 to 15 µm.

Advantageous Effects of Invention

The present invention makes it possible to increase the thickness of a sintered body. Thus, the present invention provides a production method that is suitable for the production of anode electrode materials with a high capacitance useful for medium- to high-voltage aluminum electrolytic capacitors, that does not involve an etching treatment, and that enables desired formation of the resulting electrode material for an aluminum electrolytic capacitor into the desired shape.

DESCRIPTION OF EMBODIMENTS

1. Production Method for Electrode Material for Aluminum Electrolytic Capacitor

The production process for an electrode material for an aluminum electrolytic capacitor of the present invention comprises the steps of:

(1) forming, in a sintering mold, an unsintered laminate in which a substrate is held between compositions comprising a powder of at least one member selected from the group consisting of aluminum and aluminum alloys; and (2) sintering the unsintered laminate in the sintering mold, wherein the method does not comprise an etching step.

The production method of the present invention is particularly characterized by Step (1) of forming an unsintered laminate in a sintering mold. Forming an unsintered laminate in a sintering mold enables formation of the capacitor into the desired shape, and increases the thickness of the composition disposed on both sides of the substrate to ensure a high capacitance. With such advantages, the production method of the present invention enables simple production of, in particular, an anode electrode material used for a medium- to high-voltage aluminum electrolytic capacitor.

Hereunder, each step of the production method of the present invention is described.

Step (1)

In Step (1), an unsintered laminate in which a substrate is held between compositions comprising a powder of at least one member selected from the group consisting of aluminum and aluminum alloys is formed in a sintering mold.

As a material, the aluminum or aluminum alloy mentioned above may have a formulation (components) similar to that of known rolled Al foil. Examples include sintered body made of aluminum and a sintered body made of an aluminum alloy. The aluminum sintered body is preferably made of aluminum having a purity of at least 99.8 wt %. The aluminum alloy sintered body is made of, for example, an alloy comprising one or a plurality members selected from silicon (Si), iron (Fe), copper (Cu), manganese (Mn), magnesium (Mg), chrome (Cr), zinc (Zn), titanium (Ti), vanadium (V), gallium (Ga), nickel (Ni), boron (B), and zirconium (Zr). The content of each of these elements in the aluminum alloy is preferably not more than 100 weight ppm, more preferably not more than 50 weight ppm.

There is no particular limitation on the shape of the powder; it is possible to suitably select a spherical, amorphous, scaly, fibrous, or other shape. A powder of spherical particles is particularly preferable. The spherical particles preferably have an average particle diameter $D_{50}$ of 1 to 15 µm, particularly preferably 3 to 15 µm. If the average particle diameter is too small, the desired withstand voltage may not be obtained. If the average particle diameter is too large, the desired capacitance may not be obtained.

The powder described above may be a powder produced by using a known method. Examples of the methods include an atomizing method, a melt spinning process, a rotating disk method, a rotating electrode process, and other rapid solidification processes. In view of industrial production, an atomizing method, in particular, a gas atomizing method, is preferable. More specifically, a powder obtained by atomizing molten metal is preferable.

The powder may also be obtained from commercially available powders. Examples of commercially available powders include products AHUZ58FN and AHUZ530C from Toyo Aluminum K.K.

The composition may contain, in addition to the powder mentioned above, known or commercially available solvents, sintering aids, surfactants, etc., as required. Examples of usable solvents include water and organic solvents, such as ethanol, toluene, ketones, and esters.

The composition may contain a small amount of binder resin. Suitable examples of binder resin include, but are not limited to, carboxy-modified polyolefin resins, vinyl acetate resins, vinyl chloride resins, vinyl chloride-vinyl acetate copolymer resins, vinyl alcohol resins, butyral resins, vinyl fluoride resins, acrylic resins, polyester resins, urethane resins, epoxy resins, urea resins, phenol resins, acrylonitrile resins, cellulose resins, paraffin wax, polyethylene wax, and other synthetic resins and waxes; and tar, glue, sumac, pine resin, beeswax, and other natural resins and waxes. These binders are classified into a type that volatilizes upon heating and a type that remains as a residue together with aluminum powder by pyrolysis, depending on the molecular weight, the type of resin, etc. The suitable type is selected according to the desired electrostatic characteristics, or the like.

When the composition contains a binder resin, the content of the binder resin is preferably 1 to 5 wt %, per 100 wt % of the composition.

The composition is preferably free of binder resin. By making the composition binder resin-free, a defatting step is not necessary after the sintering of the composition, thereby further increasing the thickness of the sintered body.

The material of the substrate is not particularly limited, and may be selected from various metals, resins, etc. In particular, resins (resin film) are usable when the substrate is volatilized, thus leaving only the film.

On the other hand, metal foil is more suitable when the substrate remains. Among the types of metal foil, aluminum foil is particularly preferable. The aluminum foil to be used may have substantially the same formulation as that of the film, or may have a different formulation from that of the film. Further, before forming the film, the surface of the aluminum foil may be roughened. The method for the surface roughening is not particularly limited; any known technique, such as washing, etching, or blasting, may be used.

There is no particular limitation on the aluminum foil used as a substrate. Pure aluminum or an aluminum alloy can be used. The aluminum foil used in the present invention may be made of an aluminum alloy that contains a necessary amount of at least one alloy element selected from silicon (Si), iron (Fe), copper (Cu), manganese (Mn), magnesium (Mg), chromium (Cr), zinc (Zn), titanium (Ti), vanadium (V), gallium (Ga), nickel (Ni), and boron (B), or aluminum that contains a limited amount of the above elements as unavoidable impurities.

The aluminum foil of the present invention may be an aluminum foil produced by using a known method. The aluminum foil can be obtained, for example, by preparing molten metal of aluminum or an aluminum alloy having the formulation mentioned above, casting the molten metal to obtain an ingot, and subjecting the ingot to appropriate homogenization. The resulting ingot is then subjected to hot rolling and cold rolling to obtain an aluminum foil.

During the cold rolling process mentioned above, intermediate annealing may be conducted at a temperature within a range of not lower than 50° C. to not higher than 500° C., and particularly not lower than 150° C. to not higher than 400° C. Further, annealing may be performed also after the cold rolling process at a temperature range of not lower than 150° C. to not higher than 650° C., and particularly not lower than 350° C. to not higher than 550° C. to obtain soft foil.

Although there is no particular limitation on the thickness of the substrate, the thickness is preferably not less than 5 μm, and not more than 100 μm; and particularly preferably not less than 10 μm, and not more than 50 μm. The thickness of the substrate may be measured using a micrometer.

The method for forming an unsintered laminate in a sintering mold is not particularly limited insofar as the substrate is held between the compositions. Examples of the method include a method of disposing a composition, the substrate, and a composition in this order from the bottom of a sintering mold, and a method of filling two sintering molds with the composition and sandwiching the substrate between the molds.

The thickness of each composition disposed on each side of the substrate of the unsintered laminate is preferably 1 to 100 mm, more preferably 2 to 50 mm. If the thickness of the composition is too large, the composition may be broken when it is retrieved from the sintering mold after the unsintered laminate is sintered in the sintering mold. If the composition is too thin, the desired capacitance may not be obtained. The thickness of the substrate may be measured using a micrometer.

By performing Step (1) described above, an unsintered laminate is formed in a sintering mold.

Step (2)

Step (2) is a step for sintering the unsintered laminate in the sintering mold. The sintering method is not particularly limited insofar as the method is capable of sintering the unsintered laminate held in the sintering mold. For example, a method of heating a sintering mold containing an unsintered laminate in a sintering furnace may be used.

The sintering temperature is preferably in a range of 560° C. to 660° C., preferably not lower than 560° C. but lower than 660° C., and more preferably not lower than 570° C. and not higher than 659° C.

The sintering time can be suitably set generally within the range of about 5 to 24 hours, although it depends on the sintering temperature, etc.

The sintering atmosphere is not particularly limited, and may be a vacuum atmosphere, an inert gas atmosphere, an oxidizing gas atmosphere (air), a reducing atmosphere, or the like. In particular, a vacuum atmosphere or a reducing atmosphere is preferable. The pressure conditions may normal pressure, reduced pressure, or increased pressure.

By performing Step (2) described above, an electrode material for an aluminum electrolytic capacitor is obtained.

Step (3)

The production method of the present invention may comprise, as necessary, Step (3) of performing anodization on the resulting electrode material for an aluminum electrolytic capacitor obtained in Step (2). By performing Step (3), an electrode is obtained from the electrode material for an aluminum electrolytic capacitor.

Although there is no particular limitation on the anodization conditions, the anodization may typically be performed by applying a current in a range of about 10 mA/cm$^2$ to 400 mA/cm$^2$ to the electrode material for at least 5 minutes in a boric acid solution with a concentration of not less than 0.01 mol and not more than 5 mol at a temperature of not lower than 30° C. and not higher than 100° C.

By performing Step (3) as described above, an electrode is obtained from the electrode material for an aluminum electrolytic capacitor.

The production method of the present invention does not include an etching step. More specifically, the electrode material for an aluminum electrolytic capacitor produced by using the production method of the present invention may be used as an electrode (electrode foil) as it is or after anodization, without being subjected to etching treatment.

The production method of the present invention preferably does not include a defatting step. By omitting a defatting step, it is possible to simplify the production of an electrode material for an aluminum electrolytic capacitor having sintered bodies with a large thickness suitable for a medium- to high-voltage aluminum electrolytic capacitor.

It is possible to obtain an electrolytic capacitor by performing a method comprising laminating anodic foil, which is prepared by using the electrode material of the present invention, and cathodic foil while disposing a separator between them, winding the laminate to form a capacitor element, impregnating the capacitor element with an electrolyte solution, and housing the capacitor element with the electrolyte solution in a case, and sealing the case with a sealing material.

2. Electrode Material for Aluminum Electrolytic Capacitor

The present invention is also an electrode material for an aluminum electrolytic capacitor produced by using the above production method. The electrode material for an aluminum electrolytic capacitor is structured such that sintered bodies are formed on both sides of a substrate, each sintered body being obtained by sintering a composition comprising a powder of at least one member selected from the group consisting of aluminum and aluminum alloys.

The sintered body is sintered while maintaining space between the particles of one member selected from the group consisting of aluminum and aluminum alloys. The particles are connected to each other while maintaining appropriate space between them, thus forming a three-dimensional network structure. By producing such a porous sintered body, the desired capacitance can be obtained without etching treatment.

Although there is no particular limitation on the shape of the sintered body, the thickness of each sintered body formed on both sides of the substrate is preferably 1 to 100 mm, and more preferably 2 to 50 mm. The thickness of the sintered body may be measured using a micrometer.

The substrate is the same as that used for the above production method.

The electrode material for an aluminum electrolytic capacitor of the present invention can be used for a low-, medium-, or high-voltage aluminum electrolytic capacitor. Since the thickness of the sintered body formed on each side of the substrate can be increased, the electrode material for an aluminum electrolytic capacitor of the present invention is suitable, in particular, for a medium- or high-voltage aluminum electrolytic capacitor (a medium- to high-voltage aluminum electrolytic capacitor).

EXAMPLES

The present invention is described in more detail below with reference to Examples and Comparative Examples. However, the present invention is not limited to the Examples.

Example 1

Aluminum powder AHUZ58FN ($D_{50}$=3.0 μm) (Toyo Aluminium K.K.) was prepared. As sintering molds, two templates having a size of 100 mm×100 mm and the depth shown in Table 1 were prepared. Each template was filled with the aluminum powder. 30 μm of aluminum foil (SB material) was prepared as a substrate and placed between the two templates filled with the aluminum powder, thereby forming an unsintered laminate in a sintering mold. The unsintered laminate in the sintering mold was sintered in a sintering furnace at 600° C. for 10 hours, thereby producing an electrode material for an aluminum electrolytic capacitor.

Examples 2 to 6

The electrode material for an aluminum electrolytic capacitor was produced in the same manner as in Example 1, except that the depth of the template was changed to that shown in Table 1.

Comparative Example 1

Aluminum powder AHUZ58FN ($D_{50}$=3.0 μm) (Toyo Aluminium K.K.) was prepared. The aluminum powder was mixed with an acrylic resin for coating binder (Toyo Ink Co., Ltd.), and the mixture was dispersed in a solvent (toluene-IPA) to obtain a coating composition. The coating composition was applied onto both sides of 30 μm of aluminum foil (SB material) using a comma coater so that each film has substantially the same thickness. After the films were dried, the aluminum foil was sintered in an argon gas atmosphere at 615° C. for 7 hours to produce an electrode material. The thickness of the electrode material after sintering was about 100 μm.

Examples 7 to 10

The electrode material for an aluminum electrolytic capacitor was produced in the same manner as in Example 1, except that aluminum powder AHUZ530C ($D_{50}$=15.0 μm) (Toyo Aluminium K.K.) was used, and the depth of the template was changed to that shown in Table 2.

Comparative Example 2

The electrode material for an aluminum electrolytic capacitor was produced in the same manner as in Comparative Example 1, except that aluminum powder AHUZ530C ($D_{50}$=15.0 μm) (Toyo Aluminium K.K.) was used.

Examples 11 to 14

The electrode material for an aluminum electrolytic capacitor was produced in the same manner as in Example 1, except that aluminum powder AHUZ58CN ($D_{50}$=5.0 μm) (Toyo Aluminium K.K.) was used, and the depth of the template was changed to that shown in Table 3.

Comparative Example 3

The electrode material for an aluminum electrolytic capacitor was produced in the same manner as in Comparative Example 1, except that aluminum powder AHUZ58CN ($D_{50}$=5.0 μm) (Toyo Aluminium K.K.) was used.

Examples 15 to 18

The electrode material for an aluminum electrolytic capacitor was produced in the same manner as in Example 1, except that aluminum powder AHUZ560C ($D_{50}$=9.0 μm) (Toyo Aluminium K.K.) was used, and the depth of the template was changed to that shown in Table 4.

Comparative Example 4

The electrode material for an aluminum electrolytic capacitor was produced in the same manner as in Comparative Example 1, except that aluminum powder AHUZ560C ($D_{50}$=9.0 μm) (Toyo Aluminium K.K.) was used.

Evaluation

Capacitance

The electrode material was subjected to chemical conversion coating at 450 V and at 550 V in an aqueous boric acid solution (50 g/L), and the capacitance of the electrode material was measured using an aqueous ammonium borate solution (3 g/L). The measurement projection area was 10 cm$^2$.

Tables 1 to 4 show the capacitances of the obtained electrode materials for aluminum electrolytic capacitor.

TABLE 1

|  | Example 1 | Example 2 | Example 3 | Example 4 | Example 5 | Example 6 | Comparative Example 1 |
|---|---|---|---|---|---|---|---|
| Depth of template | 1.0 mm | 2.0 mm | 3.0 mm | 5.0 mm | 25.0 mm | 50.0 mm | — |
| Total thickness of composition | 2.0 mm | 4.0 mm | 6.0 mm | 10.0 mm | 50.0 mm | 100.0 mm | 100 μm |
| Capacitance (μF/per electrode material) | 5700 | 11250 | 16950 | 28300 | 144000 | 288000 | 280 |
| Capacitance per volume (μF/per electrode material) | 0.281 | 0.279 | 0.281 | 0.282 | 0.288 | 0.288 | 0.215 |

TABLE 2

|  | Example 7 | Example 8 | Example 9 | Example 10 | Comparative Example 2 |
|---|---|---|---|---|---|
| Depth of template | 1.0 mm | 5.0 mm | 25.0 mm | 50.0 mm | — |
| Total thickness of composition | 2.0 mm | 10.0 mm | 50.0 mm | 100.0 mm | 100 μm |
| Capacitance (μF/per electrode material) | 1920 | 9820 | 49090 | 97400 | 97 |
| Capacitance per volume (μF/per electrode material) | 0.095 | 0.098 | 0.098 | 0.097 | 0.094 |

TABLE 3

|  | Example 11 | Example 12 | Example 13 | Example 14 | Comparative Example 3 |
|---|---|---|---|---|---|
| Depth of template | 1.0 mm | 5.0 mm | 25.0 mm | 50.0 mm | — |
| Total thickness of composition | 2.0 mm | 10.0 mm | 50.0 mm | 100.0 mm | 100 μm |
| Capacitance (μF/per electrode material) | 4400 | 22550 | 111020 | 219840 | 217 |
| Capacitance per volume (μF/per electrode material) | 0.220 | 0.226 | 0.222 | 0.220 | 0.217 |

TABLE 4

|  | Example 15 | Example 16 | Example 17 | Example 18 | Comparative Example 4 |
|---|---|---|---|---|---|
| Depth of template | 1.0 mm | 5.0 mm | 25.0 mm | 50.0 mm | — |
| Total thickness of composition | 2.0 mm | 10.0 mm | 50.0 mm | 100.0 mm | 100 μm |
| Capacitance (μF/per electrode material) | 3420 | 17070 | 85630 | 172500 | 131 |
| Capacitance per volume (μF/per electrode material) | 0.130 | 0.132 | 0.133 | 0.134 | 0.132 |

Results

As is clear from the results of Table 1, the thickness of the composition formed on each side of the substrate was greater in Examples 1 to 6, in which an unsintered laminate obtained by placing a substrate between compositions comprising aluminum powder was formed in a sintering mold and then the laminate was sintered, than the thickness of the compound of Comparative Example 1, in which the substrate was coated with the composition and then the coated substrate was sintered. Consequently, in Examples 1 to 6, it was possible to increase the total thickness of the sintered body, thereby obtaining an electrode material for an aluminum electrolytic capacitor having a high capacitance. Further, in Examples 1 to 6, there was a tendency that, since the total thickness of the sintered body increased as the total thickness of the composition increased, the proportion of the thickness of the substrate in the electrode for an aluminum electrolytic capacitor relatively decreased, thereby increasing the capacitance per volume.

As is clear from the results of Table 2, the thickness of the composition provided on each side of the substrate was greater in Examples 7 to 10, in which an unsintered laminate obtained by holding a substrate between compositions comprising aluminum powder was formed in a sintering mold and then the laminate was sintered, than the thickness of the compound of Comparative Example 2, in which the substrate was coated with the composition and then the coated substrate was sintered. Consequently, in Examples 7 to 10, it was possible to increase the total thickness of the sintered body, thereby obtaining an electrode material for an aluminum electrolytic capacitor having a high capacitance. Further, in Examples 7 to 10, there was a tendency that, since the total thickness of the sintered body increased as the total thickness of the composition increased, the proportion of the thickness of the substrate in the electrode for an aluminum electrolytic capacitor relatively decreased, thereby increasing the capacitance per volume.

As is clear from the results of Table 3, the thickness of the composition provided on each side of the substrate was greater in Examples 11 to 14, in which an unsintered laminate obtained by holding a substrate between compositions comprising aluminum powder was formed in a sintering mold and then the laminate was sintered, than the thickness of the compound of Comparative Example 3, in which the substrate was coated with the composition and then the coated substrate was sintered. Consequently, in Examples 11 to 14, it was possible to increase the total thickness of the sintered body, thereby obtaining an electrode material for an aluminum electrolytic capacitor having a high capacitance.

As is clear from the results of Table 4, the thickness of the composition provided on each side of the substrate was greater in Examples 15 to 18, in which an unsintered laminate obtained by holding a substrate between compositions comprising aluminum powder was formed in a sintering mold and then the laminate was sintered, than the thickness of the compound of Comparative Example 4, in which the substrate was coated with the composition and then the coated substrate was sintered. Consequently, in Examples 15 to 18, it was possible to increase the total thickness of the sintered body, thereby obtaining an electrode material for an aluminum electrolytic capacitor having a high capacitance. Further, in Examples 15 to 18, there was a tendency that, since the total thickness of the sintered body increased as the total thickness of the composition increased, the proportion of the thickness of the substrate in the electrode for an aluminum electrolytic capacitor relatively decreased, thereby increasing the capacitance per volume.

Tables 1 and 2 revealed that the average particle diameter $D_{50}$ of the aluminum powder was 3.0 µm, and that the capacitance was higher in Examples 1 to 6, which use aluminum powder having a relatively small average particle diameter, namely, having an average particle diameter $D_{50}$ of 15.0 µm, than the capacitance in Examples 7 to 10 using aluminum powder having a relatively large average particle diameter.

Further, as is clear from the results of Tables 1 to 4, provided that all compositions have the same total thickness, the capacitance of the electrode material for an aluminum electrolytic capacitor increased as the average particle diameter $D_{50}$ decreased. Specifically, the capacitance was lowest in Examples 7 to 10, which use aluminum powder having an average particle diameter of 15.0 µm; followed by Examples 15 to 18, which use aluminum powder having an average particle diameter of 9.0 µm; Examples 11 to 14, which use an average particle diameter of 5.0 µm; and Examples 1 to 6, which use having an average particle diameter of 3.0 µm. Thus, it was revealed that an electrode material for an aluminum electrolytic capacitor with a high capacitance can be obtained by using aluminum powder having a small average particle diameter $D_{50}$.

The invention claimed is:

1. A method for producing an electrode material for aluminum electrolytic capacitor, comprising the steps of:
    (1) forming, in a sintering mold, an unsintered laminate in which a substrate is held between compositions comprising a powder of at least one member selected from the group consisting of aluminum and aluminum alloys; and
    (2) sintering the unsintered laminate in the sintering mold, wherein the method does not comprise an etching step.

2. The method according to claim 1, wherein the substrate is an aluminum foil or an aluminum alloy foil.

3. The method according to claim 1, wherein each of the compositions on both sides of the substrate in the unsintered laminate has a thickness of 1 to 100 mm.

4. The method according to claim 1, wherein the method does not comprise a defatting step.

5. The method according to claim 1, wherein the sintering is performed at 560 to 660° C.

6. The method according to claim 1, wherein the powder has an average particle diameter $D_{50}$ of 1 to 15 µm.

7. The method according to claim 1, wherein the composition is free of binder resin.

8. An electrode material for aluminum electrolytic capacitor produced by the method according to claim 1, wherein the electrode material is structured such that sintered bodies are formed on both sides of a substrate, each sintered body being obtained by sintering a composition comprising a powder of at least one member selected from the group consisting of aluminum and aluminum alloys.

9. The electrode material for aluminum electrolytic capacitor according to claim 8, wherein each of the sintered bodies on both sides of the substrate has a thickness of 1 to 100 mm.

10. The electrode material for aluminum electrolytic capacitor according to claim 8, wherein the substrate is an aluminum foil or an aluminum alloy foil.

11. The electrode material for aluminum electrolytic capacitor according to claim 8, wherein the powder has an average particle diameter $D_{50}$ of 1 to 15 µm.

* * * * *